United States Patent
Yi et al.

(10) Patent No.: US 11,297,651 B2
(45) Date of Patent: Apr. 5, 2022

(54) MULTIPLE RANDOM ACCESS PREAMBLE TRANSMISSION FOR A SINGLE RANDOM ACCESS PROCEDURE

(71) Applicant: LG Electronics Inc., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 447 days.

(21) Appl. No.: 16/332,458

(22) PCT Filed: Sep. 6, 2017

(86) PCT No.: PCT/KR2017/009740
§ 371 (c)(1),
(2) Date: Mar. 12, 2019

(87) PCT Pub. No.: WO2018/048182
PCT Pub. Date: Mar. 15, 2018

(65) Prior Publication Data
US 2021/0289556 A1   Sep. 16, 2021

Related U.S. Application Data

(60) Provisional application No. 62/393,098, filed on Sep. 12, 2016.

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01); *H04W 74/008* (2013.01)

(58) Field of Classification Search
CPC .......... H04W 74/0833; H04W 74/006; H04W 74/008; H04W 72/0413; H04W 72/044
See application file for complete search history.

(56) References Cited

U.S. PATENT DOCUMENTS 10,123,254 B2   11/2018   Jang et al.
10,129,824 B2   11/2018   Kim et al.
(Continued)

FOREIGN PATENT DOCUMENTS

EP      3048851      7/2016
JP    2015146645     8/2015
(Continued)

OTHER PUBLICATIONS

PCT International Search Report and Written Opinion in International Application No. PCT/KR2017/009740, dated Nov. 24, 2017, 13 pages.
United States Notice of Allowance in U.S. Appl. No. 15/698,558, dated Dec. 11, 2018, 7 pages.
Ericsson, "Random access for Rel-13 low complexity and enhanced coverage UEs," R2-153717, 3GPP TSG-RAN WG2 #91, Beijing, P.R. China, dated Aug. 24-28, 2015, 7 pages, XP051040232.
(Continued)

*Primary Examiner* — Thai Nguyen
(74) *Attorney, Agent, or Firm* — Fish & Richardson P.C.

(57) ABSTRACT

Method and apparatus for a user equipment (UE) performing random access are disclosed. For this end, the UE transmits first multiple random access preambles for a random access procedure to the network, and monitors random access responses respectively corresponding to each of the first multiple random access preambles during each of multiple random access response reception windows. The UE transmits second multiple random access preambles for the random access procedure to the network, if a random access response reception of the first multiple random access preambles is determined as not successful. Here, the random access response reception is determined as not successful, when none of the random access responses is successfully received until a last random access response reception window among the multiple random access response reception windows ends.

8 Claims, 9 Drawing Sheets

(56) References Cited

U.S. PATENT DOCUMENTS

| | | | |
|---|---|---|---|
| 2010/0255847 A1 | 10/2010 | Lee et al. | |
| 2011/0013542 A1 | 1/2011 | Yu et al. | |
| 2011/0103328 A1 | 5/2011 | Lee et al. | |
| 2012/0002606 A1 | 1/2012 | Vujcic | |
| 2013/0265866 A1* | 10/2013 | Yi | H04W 74/0858 370/216 |
| 2014/0056243 A1 | 2/2014 | Pelletier et al. | |
| 2014/0376466 A1 | 12/2014 | Jeong et al. | |
| 2015/0117374 A1 | 4/2015 | Wu | |
| 2015/0305014 A1 | 10/2015 | Li et al. | |
| 2016/0142860 A1 | 5/2016 | Kim et al. | |
| 2016/0255591 A1 | 9/2016 | Park et al. | |
| 2016/0262109 A1 | 9/2016 | Chen et al. | |
| 2017/0290064 A1* | 10/2017 | Liu | H04W 74/0833 |

FOREIGN PATENT DOCUMENTS

| | | |
|---|---|---|
| KR | 20140017331 | 2/2014 |
| WO | WO2012150809 | 11/2012 |
| WO | WO2013112009 | 8/2013 |
| WO | WO2013119018 | 8/2013 |
| WO | WO2014021611 | 2/2014 |
| WO | WO2015083997 | 6/2015 |

OTHER PUBLICATIONS

Extended European Search Report in European Application No. 17849066.0, dated Feb. 27, 2020, 11 pages.
Fujitsu, "The impacts on RAR caused by preamble repetition," R1-151565, 3GPP TSG RAN WG1 Meeting #80bis, Belgrade, Serbia, dated Apr. 20-24, 2015, 3 pages, XP050934437.
Intel Corporation, "Impacts on random access procedure for Release-13 low complexity UEs and enhanced coverage," R2-152162, 3GPP TSG-RAN WG2 Meeting #90, Fukuoka, Japan, dated May 25-29, 2015, 6 pages, XP050973560.
LG Electronics Inc., "RA Procedure in NR," R2-1704499, 3GPP TSG-RAN WG2 Meeting #98, Hangzhou, China, dated May 15-19, 2017, 3 pages, XP051263602.
Office Action in Japanese Appln. No. 2019-510845, dated Jul. 6, 2021, 6 pages (with English translation).
Huawei, HiSilicon, "Remaining NB-IoT random access physical layer aspects," R1-162630, 3GPP TSG RAN WG1 Meeting #84bis, Busan, Korea, Apr. 11-15, 2016, 6 pages.
Korean Notice of Allowance in Korean Appln No. 10-2019-7003283, dated Jan. 10, 2022, 4 pages (with English translation).
Lenovo, "Discussion on Several Remaining Issues on Rel-13 eMTC," R1-161007, 3GPP TSG RAN WG1 Meeting #84, St. Julians, Malta, Feb. 15-19, 2016, 6 pages.

* cited by examiner

[Fig. 1]
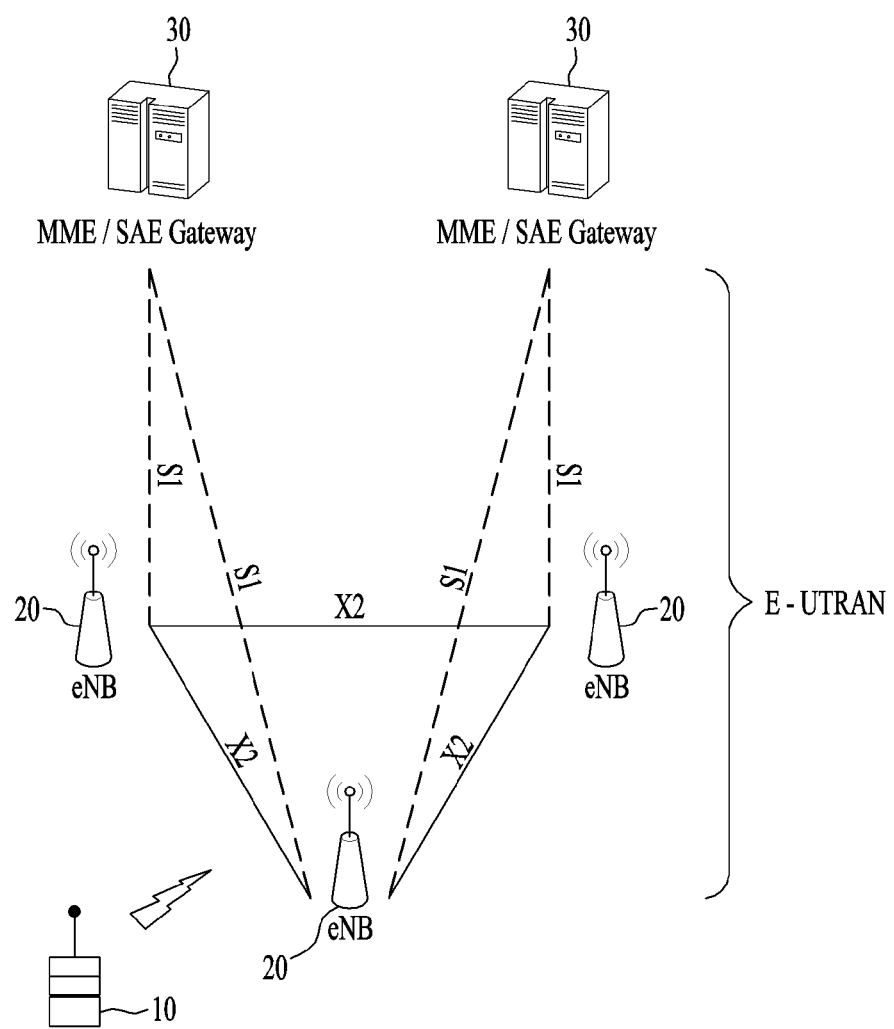

[Fig. 2]
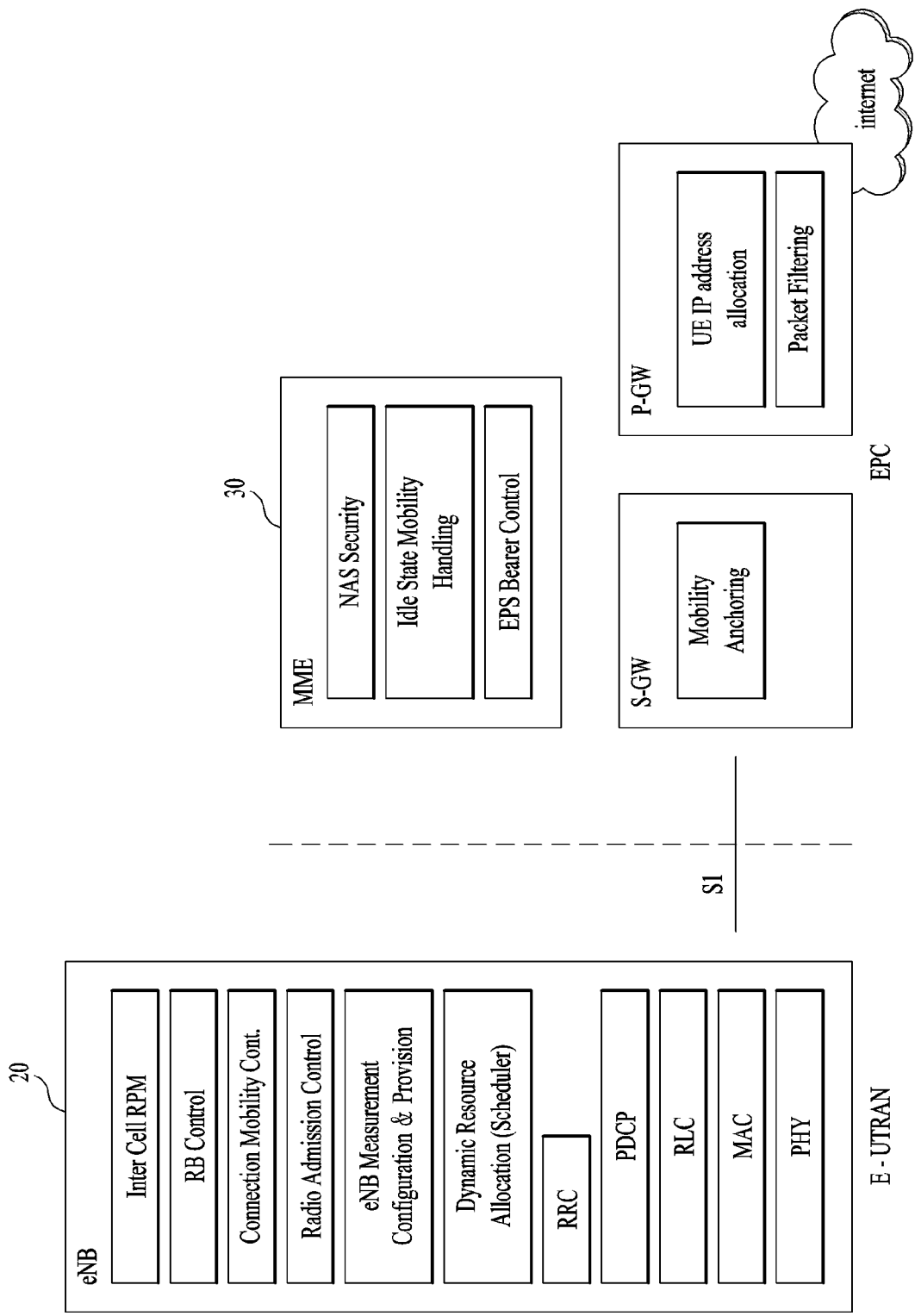

[Fig. 3]
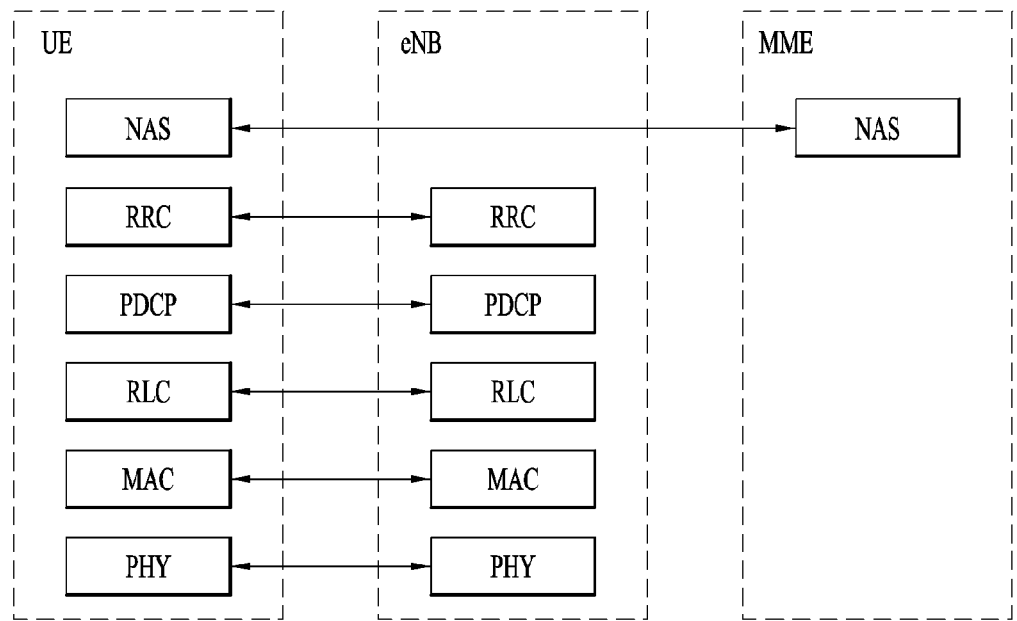
(a) Control-Plane Protocol Stack
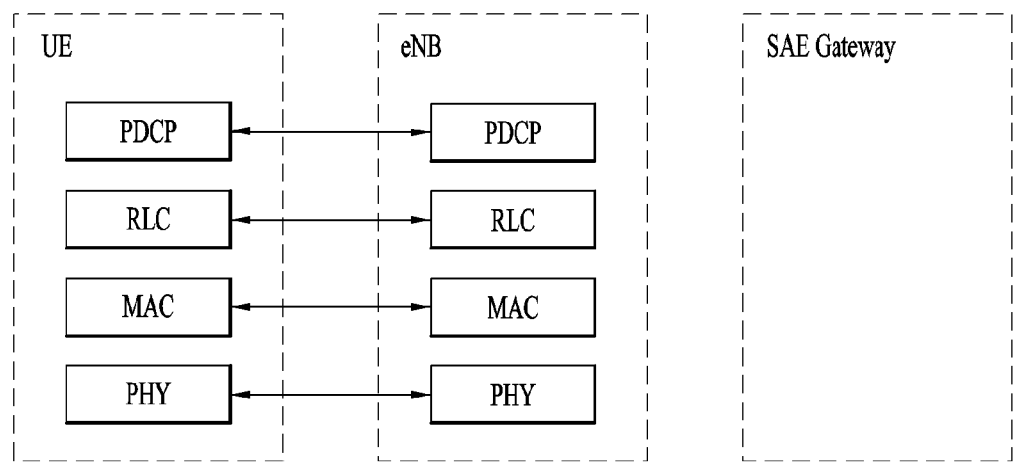
(b) User-Plane Protocol Stack

[Fig. 4]
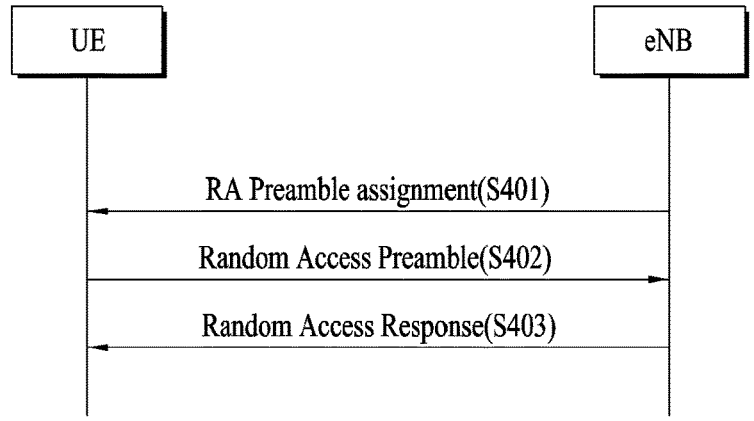
[Fig. 5]
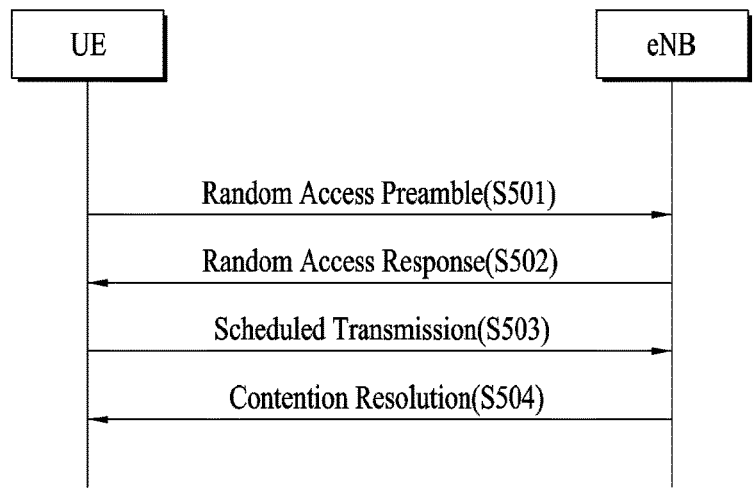
[Fig. 6]
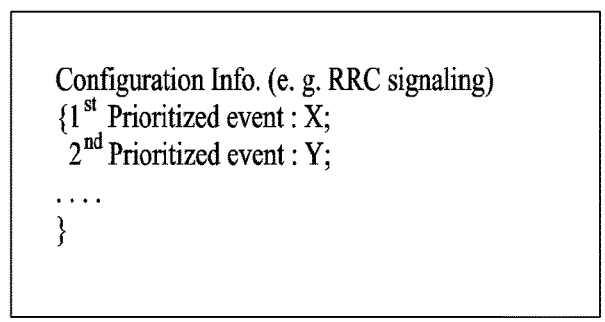

[Fig. 7]
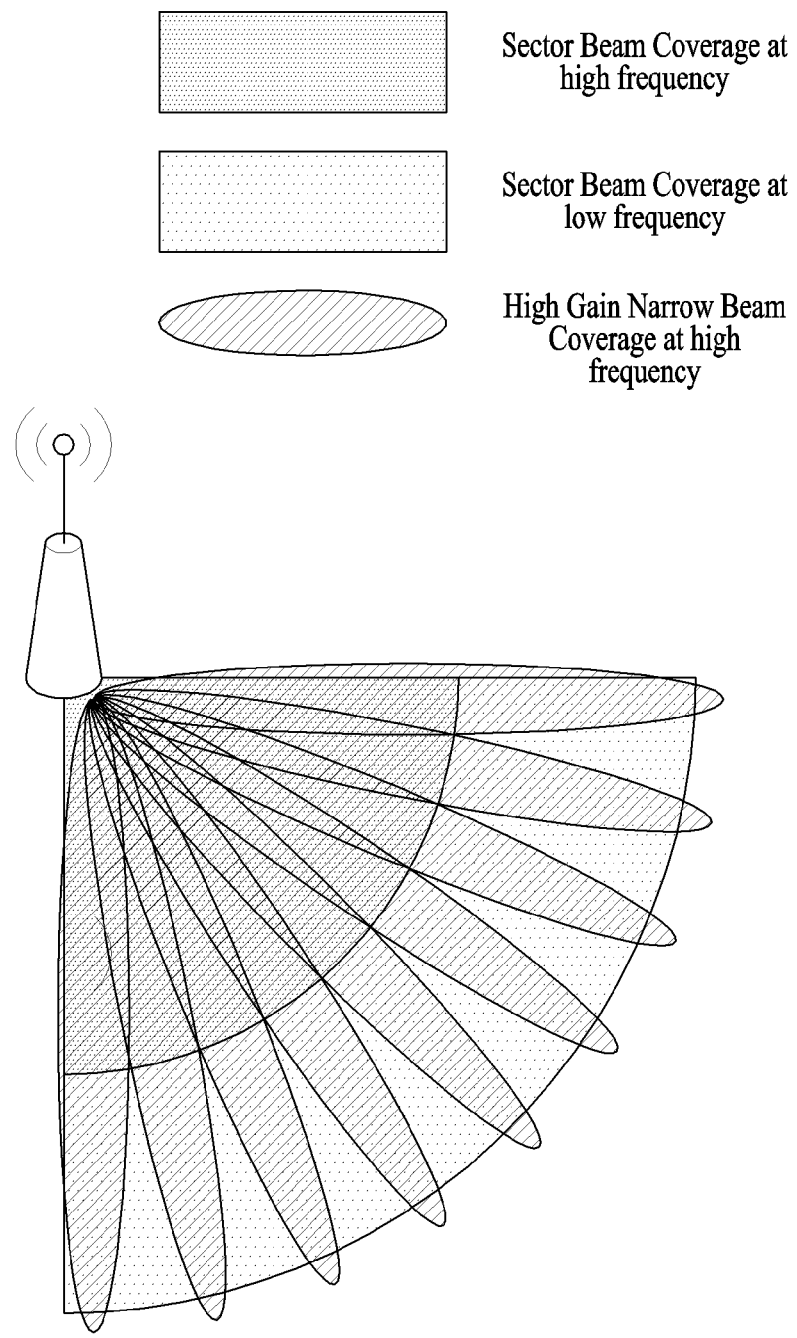

[Fig. 8]
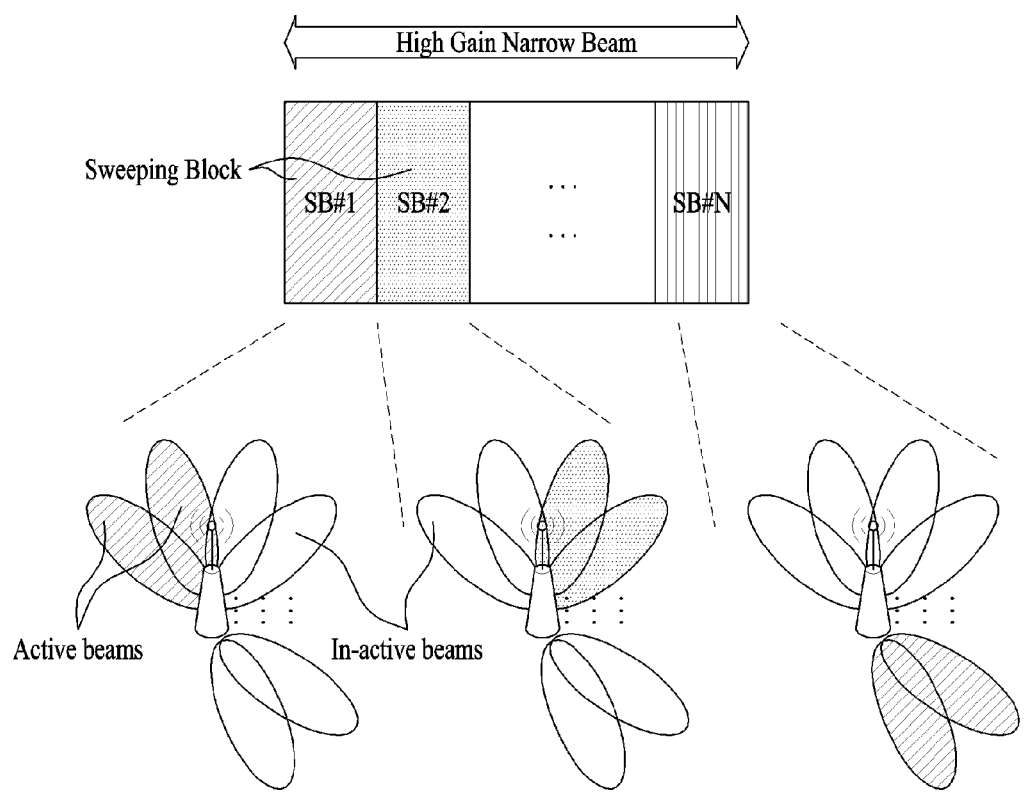

[Fig. 9]
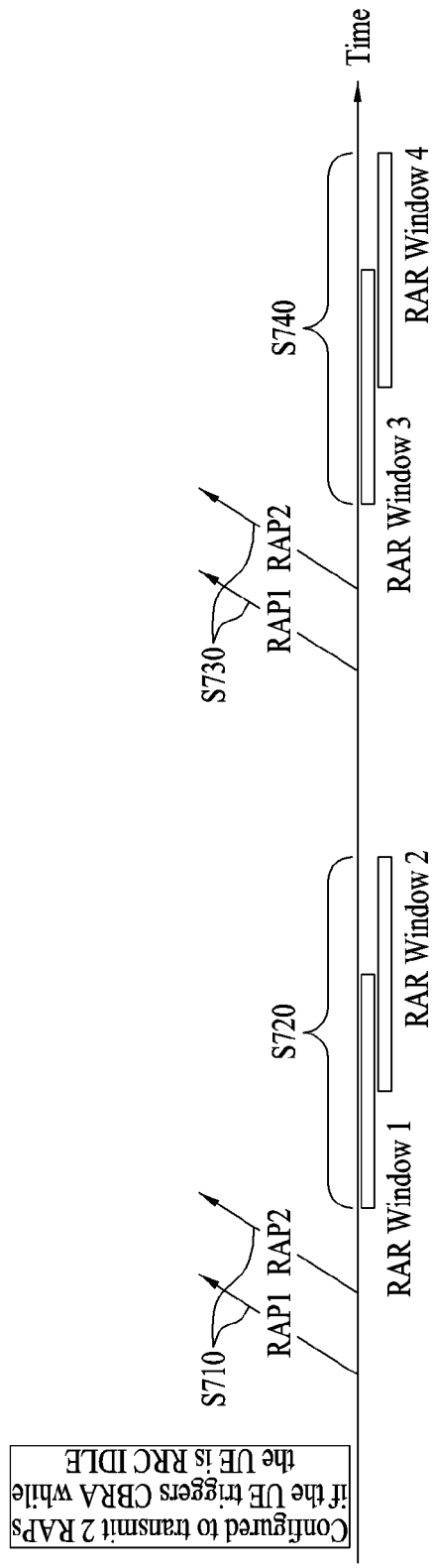

[Fig. 10]
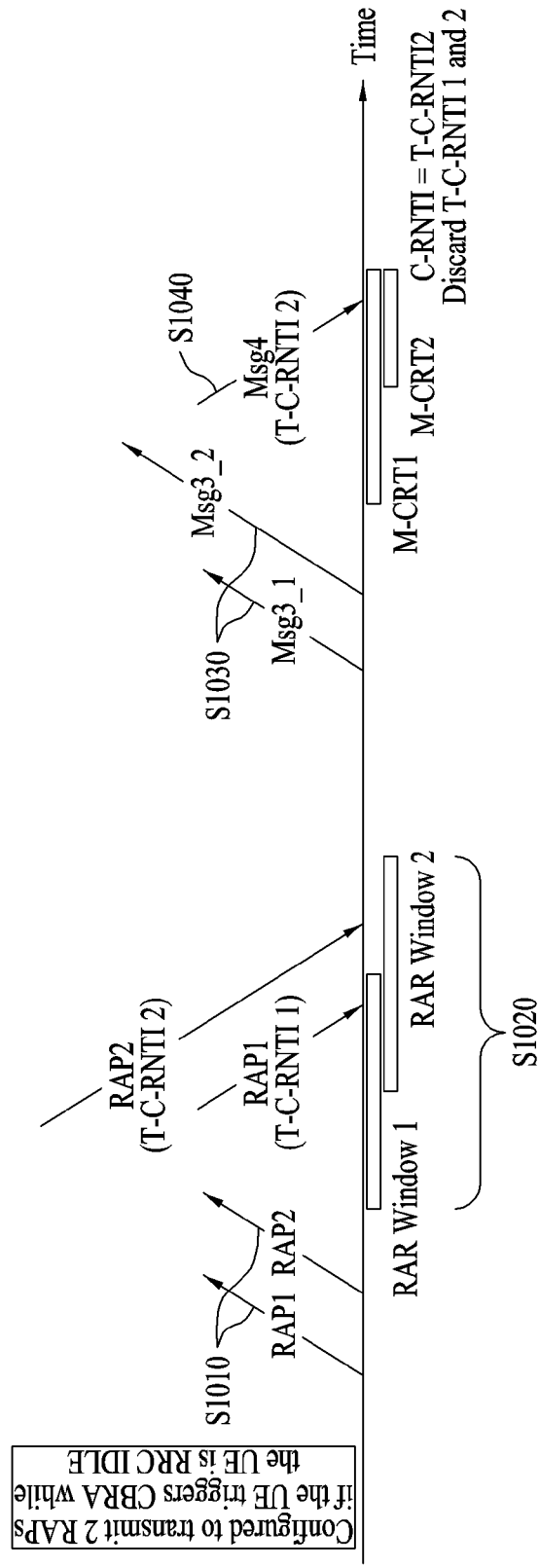

[Fig. 11]
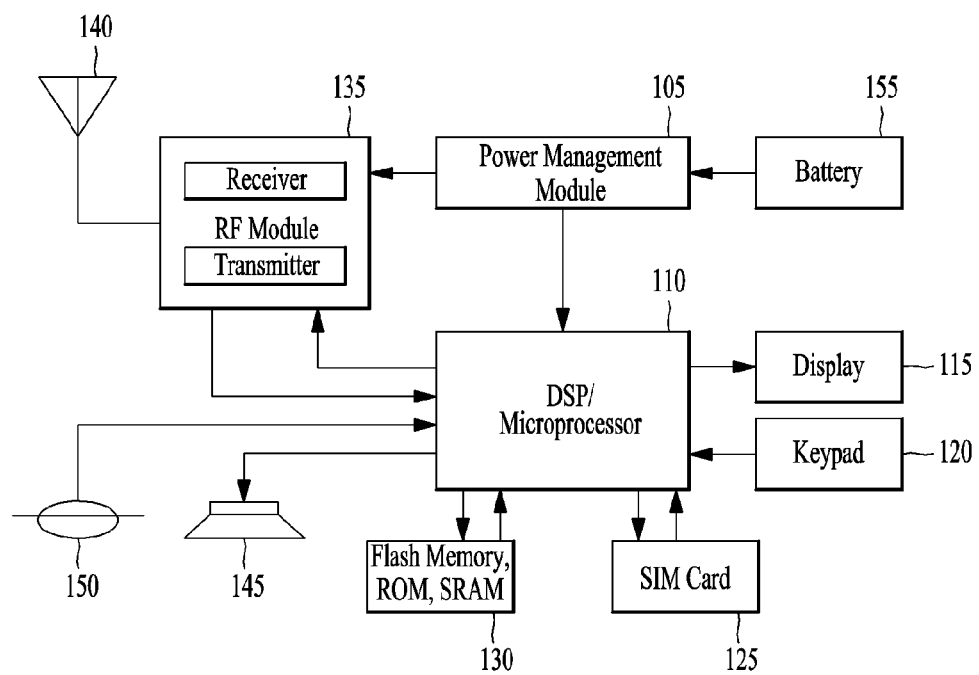

MULTIPLE RANDOM ACCESS PREAMBLE TRANSMISSION FOR A SINGLE RANDOM ACCESS PROCEDURE

CROSS-REFERENCE TO RELATED APPLICATIONS

This application is a National Stage application under 35 U.S.C. § 371 of International Application No. PCT/KR2017/009740, filed on Sep. 6, 2017, which claims the benefit of U.S. Provisional Application No. 62/393,098, filed on Sep. 12, 2016. The disclosures of the prior applications are incorporated by reference in their entirety.

TECHNICAL FIELD

The present invention relates to a wireless communication system supporting random access procedure. More specifically, the present invention related to a method and apparatus for transmitting multiple random access preambles for a single random access procedure.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be referred to as eNB, gNB etc. However, in the following explanation, the term 'UE' and 'eNodeB' are used for convenience.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

DISCLOSURE OF INVENTION

Technical Problem

In the LTE system, a UE performs only one random access (RA) procedure at one point in time. In other words, the UE selects one RA procedure if multiple RA procedures are initiated due to different reasons, e.g., RA triggered by MAC and RA triggered by PDCCH order.

The reason for restricting to only one RA procedure at one point in time was that there wouldn't be any big gain in performing multiple RA procedures with different purposes while it would require more complex UE/eNB behavior managing simultaneous RA procedures from one UE.

Using one RA procedure means that the other random access procedure (RAP) can only be transmitted after RAR reception failure or Contention Resolution failure. I.e., the UE doesn't transmit multiple random access preambles (RAPs) in parallel. Therefore, it would take certain time duration for RAR reception and Contention Resolution following the transmission of one RAP. In the prior art, there has been no way to reduce the total time of one RA procedure or to increase a chance to succeed RAR reception or Contention Resolution.

Also, in the development to a New Radio Access Technology (NR), NR system should be able to use frequency bands up to 100 GHz. To compensate the increased path loss of higher frequency bands, the need for beam forming was identified. In addition, to cover the narrowness due to the beam forming, 'beam sweeping' technology has been introduced. For the beam sweeping, NR BS/UE may repeat the same signal over predetermined number of time units to cover the whole range.

Solution to Problem

To achieve these objects and other advantages and in accordance with the purpose of the invention, as embodied and broadly described herein, a method for a user equipment (UE) performing random access to a network, the method comprising: transmitting first multiple random access preambles for a random access procedure to the network; monitoring random access responses respectively corresponding to each of the first multiple random access preambles during each of multiple random access response reception windows; and transmitting second multiple random access preambles for the random access procedure to the network, if a random access response reception of the first multiple random access preambles is determined as not successful, wherein the random access response reception is determined as not successful, when none of the random access responses is successfully received until a last random access response reception window among the multiple random access response reception windows ends, is proposed.

The UE may consider the random access response reception of the first multiple random access preambles is successful and transmits a message 3 to the network, when at least one of the random access responses is received until the last random access response reception window ends.

The UE may not further monitor another random access response if the at least one of the random access responses is received.

The above method may further comprise: transmitting two or more messages 3 of the random access procedure to the network, when two or more random access responses are received; and starting two or more contention resolution timers for each of the messages 3.

A contention resolution by the two or more message 3 may be determined as not successful, when none of messages 4 corresponding to each of the two or more messages 3 is received until a last contention resolution timer among the contention resolution timers ends.

In another aspect of the present invention, a user equipment (UE) performing random access to a network, the UE comprising: a transceiver configured to transmit first multiple random access preambles for a random access procedure to the network; and a processor configured to monitor random access responses respectively corresponding to each of the first multiple random access preambles during each of multiple random access response reception windows, wherein the processor controls the transceiver to transmit second multiple random access preambles for the random access procedure to the network, if a random access response reception of the first multiple random access preambles is determined as not successful, wherein the processor determines the random access response reception as not successful, when none of the random access responses is successfully received until a last random access response reception window among the multiple random access response reception windows ends, is proposed.

The processor may consider the random access response reception of the first multiple random access preambles is successful and controls the transceiver to transmit a message 3 to the network, when at least one of the random access responses is received until the last random access response reception window ends.

The processor may not further monitor another random access response if the at least one of the random access responses is received.

The processor may control the transceiver to transmit two or more messages 3 of the random access procedure to the network, when two or more random access responses are received, and the processor may start two or more contention resolution timers for each of the messages 3.

The processor may determine a contention resolution by the two or more message 3 as not successful, when none of messages 4 corresponding to each of the two or more messages 3 is received until a last contention resolution timer among the contention resolution timers ends.

Advantageous Effects of Invention

According to the embodiments of the present invention, the total time of on RA procedure can be reduced and/or the chance to succeed RAR reception and contention resolution increases.

Also, the above embodiments can efficiently support the beam sweeping scheme for NR system.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram illustrating network structure of an evolved universal mobile telecommunication system (E-UMTS);

FIG. 2 is a block diagram depicting architecture of a typical E-UTRAN and a typical EPC;

FIG. 3 is a diagram showing a control plane and a user plane of a radio interface protocol between a UE and an E-UTRAN based on a 3GPP radio access network standard;

FIG. 4 is a diagram illustrating an operation procedure of a user equipment and a base station during a non-contention based random access procedure;

FIG. 5 is a diagram illustrating an operation procedure of a user equipment and a base station during a contention based random access procedure;

FIG. 6 shows an example of configuration information for multiple RAPs according to one embodiment of the present invention;

FIG. 7 shows the effect of higher frequencies on coverage and the compensation of path loss by using multiple narrow beams for downlink common channels;

FIG. 8 shows the concept of beam sweeping according to one aspect of the present invention;

FIG. 9 shows an example for a UE to transmit multiple RAPs for a single RA procedure according to one embodiment of the present invention;

FIG. 10 shows another example for a UE to transmit multiple RAPs for a single RA procedure according to one embodiment of the present invention;

FIG. 11 is a block diagram of a communication apparatus according to an embodiment of the present invention.

MODE FOR THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the following description relates to a wireless communication system supporting random access procedure (RAP). So, the details of the RAP is explained first.

FIG. 4 is a diagram illustrating an operation procedure of a user equipment and a base station during a non-contention based random access procedure.

(1) Random Access Preamble Assignment

The non-contention based random access procedure can be performed for two cases, i.e., (1) when a handover procedure is performed, and (2) when requested by a command of the base station. Of course, the contention based random access procedure may also be performed for the two cases.

First of all, for non-contention based random access procedure, it is important that the user equipment receives a designated random access preamble having no possibility of contention from the base station. Examples of a method of receiving a random access preamble include a method through a handover command and a method through a PDCCH command. A random access preamble is assigned to the user equipment through the method of receiving a random access preamble (S401).

(2) First Message Transmission

As described above, after receiving a random access preamble designated only for the user equipment, the user equipment transmits the preamble to the base station (S402).

(3) Second Message Reception

After the user equipment transmits the random access preamble in step S402, the base station tries to receive its random access response within a random access response receiving window indicated through system information or handover command (S403). In more detail, the random access response can be transmitted in the form of a MAC protocol data unit (MAC PDU), and the MAC PDU can be transferred through a physical downlink shared channel (PDSCH). Also, it is preferable that the user equipment monitors a physical downlink control channel (PDCCH) to appropriately receive information transferred to the PDSCH. Namely, it is preferable that the PDCCH includes information of a user equipment which should receive the PDSCH, frequency and time information of radio resources of the PDSCH, and a transport format of the PDSCH. If the user equipment successfully receives the PDCCH transmitted thereto, the user equipment can appropriately receive a random access response transmitted to the PDSCH in accordance with the information of the PDCCH. The random access response can include a random access preamble identifier (ID) (for example, random access preamble identifier (RA-RNTI)), uplink grant indicating uplink radio resources, a temporary C-RNTI, and timing advance command (TAC) values.

As described above, the random access preamble identifier is required for the random access response to indicate whether the uplink grant, the temporary C-RNTI and the TAC values are effective for what user equipment as random access response information for one or more user equipments can be included in one random access response. In this case, it is assumed that the user equipment selects a random access preamble identifier corresponding to the random access preamble selected in step S402.

In the non-contention based random access procedure, the user equipment can terminate the random access procedure after determining that the random access procedure has been normally performed by receiving the random access response information.

FIG. 5 is a diagram illustrating an operation procedure of a user equipment and a base station during a contention based random access procedure.

(1) First Message Transmission

First of all, the user equipment randomly selects one random access preamble from a set of random access preambles indicated through system information or handover command, and selects a physical RACH (PRACH) resource that can transmit the random access preamble (S501).

(2) Second Message Reception

A method of receiving random access response information is similar to that of the aforementioned non-contention based random access procedure. Namely, after the user equipment transmits the random access preamble in step S402, the base station tries to receive its random access response within a random access response receiving window indicated through system information or handover command, and receives the PDSCH through corresponding random access identifier information (S502). In this case, the base station can receive uplink grant, a temporary C-RNTI, and timing advance command (TAC) values.

(3) Third Message Transmission

If the user equipment receives its effective random access response, the user equipment respective processes information included in the random access response. Namely, the user equipment applies TAC and store a temporary C-RNTI. Also, the user equipment transmits data (i.e., third message) to the base station using UL grant (S503). The third message should include a user equipment identifier. This is because that the base station needs to identify user equipments which perform the contention based random access procedure, thereby avoiding contention later.

Two methods have been discussed to include the user equipment identifier in the third message. In the first method, if the user equipment has an effective cell identifier previously assigned from a corresponding cell before the random access procedure, the user equipment transmits its cell identifier through an uplink transport signal corresponding to the UL grant. On the other hand, if the user equipment does not have an effective cell identifier previously assigned from a corresponding cell before the random access procedure, the user equipment transmits its cell identifier including its unique identifier (for example, S-TMSI or random ID). Generally, the unique identifier is longer than the cell identifier. If the user equipment transmits data corresponding to the UL grant, the user equipment starts a contention resolution timer.

(4) Fourth Message Reception

After transmitting data including its identifier through UL grant included in the random access response, the user equipment waits for a command of the base station for contention resolution. Namely, the user equipment tries to receive the PDCCH to receive a specific message (504). Two methods have been discussed to receive the PDCCH. As described above, if the third message is transmitted to correspond to the UL grant using the user equipment identifier, the user equipment tries to receive the PDCCH using its cell identifier. If the user equipment identifier is a unique identifier of the user equipment, the user equipment tries to receive the PDCCH using a temporary cell identifier included in the random access response. Afterwards, in case of the first method, if the user equipment receives the PDCCH through its cell identifier before the contention resolution timer expires, the user equipment determines that the random access procedure has been performed normally, and ends the random access procedure. In case of the second method, if the user equipment receives the PDCCH through the temporary cell identifier before the contention resolution timer expires, the user equipment identifies data transferred from the PDSCH. If the unique identifier of the user equipment is included in the data, the user equipment determines that the random access procedure has been performed normally, and ends the random access procedure.

Multiple RAP Transmission for Each Prioritized Events

As explained before, in the prior art, the UE performs only one RA procedure at one point in time. Thus, there has been no way to reduce the total time of one RA procedure or to increase a chance to succeed RAR reception or Contention Resolution.

Considering that Contention based RA (CBRA) is used for initial RRC Connection establishment as well as uplink data transmission, there is a need for a method to increase a chance to succeed the RA procedure depending on e.g., RA initiation purpose, or the priority of uplink data.

In order to increase the RA procedure completion probability for a prioritized event, it is proposed that, when a UE initiates a RAP, the UE may transmit at least two Random Access Preambles (RAPs) in parallel if the UE triggers the RAP due to a prioritized event. More generally, the number of RAPs may be configured by the network for each of prioritized events.

FIG. 6 shows an example of configuration information for multiple RAPs according to one embodiment of the present invention.

First, the UE may receive configuration information as shown in FIG. 6 from the network. This configuration information may be a RRC signaling.

As shown in FIG. 6, the configuration information may include each of prioritized events (e.g. $1^{st}$ prioritized event, $2^{nd}$ prioritized event, and so on). For each of the prioritized events, the number of RAPs are determined (e.g. X for $1^{st}$ prioritized event, Y for $2^{nd}$ prioritized event).

Based on this configuration information, the UE may transmit X RAPs, if the RA procedure is triggered by the $1^{st}$ prioritized event. Likewise, the UE may transmit Y RAPs, if the RA procedure is triggered by the $2^{nd}$ prioritized event.

Here, $1^{st}$ prioritized event may be a first type event where the UE wants to establish an RRC (Radio Resource Control) connection to the network. Likewise, $2^{nd}$ priority event may be a second type event where uplink data becomes available for transmission in a logical channel with predetermined priority.

In summary, the UE can be is configured by a network to transmit at least two RAPs if the UE triggers the Contention based Random Access (CBRA) procedure due to a prioritized event. The prioritized event may includes:

(1) The UE establishes an RRC Connection, i.e., (i) the UE initiates the CBRA procedure while the UE is not in RRC CONNECTED, e.g., RRC IDLE; or (ii) the UE initiates the CBRA procedure when an uplink data becomes available for transmission in CCCH logical channel;

(2) An uplink data becomes available for transmission in a logical channel with a certain priority, e.g., logical channel priority, here, the certain priority is configured by a network or pre-defined in the specification, e.g., 1 or 2.

The UE may be configured by the network how many RAPs the UE sends when the UE initiates the CBRA due to a prioritized event. That is, the UE can be configured to transmit different number of RAPs depending on the prioritized event that triggers CBRA procedure. For example, the UE is configured to transmit 3 RAPs when the UE initiates the CBRA in order to establish RRC Connection while the UE is configured to transmit 2 RAPs when the initiates the CBRA due to uplink data from a logical channel with logical channel priority 1.

Multiple RAP Transmission for Beam Sweeping

As stated above, NR system should be able to use frequency bands up to 100 GHz. To compensate the increased path loss of higher frequency bands, the need for beam forming was identified.

FIG. 7 shows the effect of higher frequencies on coverage and the compensation of path loss by using multiple narrow beams for downlink common channels.

In lower frequency bands (e.g. current LTE bands <6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that NR BS is able to form may be limited by the cost and complexity of the utilized transceiver architecture. In practice, on higher frequencies, the number of concurrent high gain beams is much less than the total number of beams required to cover the cell area. In other words, the NR BS is able to cover only part of the cell area by using a subset of beams at any given time.

FIG. 8 shows the concept of beam sweeping according to one aspect of the present invention.

As shown in FIG. 8, NR BS needs to sweep through the cell coverage area in time domain by activating different set of beams at any given time. Thus for NR, a so-called sweeping subframe may be introduced to provide coverage for common control channel signalling periodically with beam forming. Sweeping subframe consists of sweeping blocks (SB) where a single block covers a specific area of the cell with a set of active high gain beams. Depending on the number of active beams per sweep block and the total number of beams required to cover a cell area, multiple sweep blocks may be needed as shown in FIG. 8.

The active beams in FIG. 8 could be used for either transmitting or receiving information thus the sweeping subframe can be defined as downlink or uplink sweeping subframe. Further, in order to properly support random access procedure by NR UE, the NR UE shall repeat multiple RAPs to cover the whole coverage.

In one example of the present invention, the UE may receive configuration information from the network regarding how many RAPs are to be repeated for a single random access procedure over multiple time domain units (e.g. SBs). Based on this configuration information, the UE may transmit multiple RAPs for the same random access procedure.

So, supporting the beam sweeping scheme might be another 'needs' for multiple RAPs transmission.

Detailed Procedure for Multiple RAP Transmission

FIG. 9 shows an example for a UE to transmit multiple RAPs for a single RA procedure according to one embodiment of the present invention.

The UE may transmit N random access preambles for a single random access procedure to the network (S710). In this example, suppose that N equals to 2. That is, the UE is configured to transmit 2 RAPs if the UE triggers CBRA while the UE is in RRC IDLE, i.e., when the UE establishes an RRC Connection. The UE may randomly select two different RAPs, i.e., RAP1 and RAP2. The UE may select RA resource, e.g., the next available subframe containing PRACH, for each selected RAP. The UE may transmit the selected RAPs on corresponding RA resource.

In summary, when the UE initiates the CBRA due to the prioritized event, the UE may transmit the RAPs as follows:

The UE by itself randomly selects a certain number of different RAPs depending on the event that triggers the CBRA procedure;

The UE selects the certain number of different RAPs within the RAP group for CBRA;

The UE determines the next available subframes containing PRACH resource to transmit the selected RAPs;

The UE transmits the selected RAPs on the subframes, where each subframes correspond to each selected RAP.

Then, the UE may monitor random access responses respectively corresponding to each of the X random access preambles during each of multiple random access response reception windows (S720). In FIG. 9, RAR window 1 is for RAP 1, and RAR window 2 is for RAP 2.

That is, if the UE transmits the certain number of RAPs, the UE monitors a PDCCH addressed with a RA-RNTI for RAR reception as follows:

The UE calculates the certain number of RA-RNTIs, where each of which is associated with each of the transmitted RAPs;

The UE manages the certain number of RAR windows, where each of RAR windows is for each of the transmitted RAPs;

Within each RAR window, the UE monitors a PDCCH addressed with the RA-RNTI associated with the RAP for the RAR window;

For example, if the UE transmits two RAPs (RAP1 and RAP2) as in FIG. 9, the UE manages two separate RAR windows (RAR Window1, RAR Window2). And, the UE monitors PDCCH addressed with RA-RNTI1 corresponding to RAP1 only in RAR Window1 while the monitors PDCCH addressed with RA-RNTI2 corresponding to RAP2 only in RAR Window2. Within the overlapping period between RAR Window 1 and 2, the UE monitors PDCCH addressed to RA-RNTI1 or RA-RNTI2.

The UE may determines a random access response reception of the first multiple random access preambles as not successful, when none of the random access responses is successfully received until the last random access response reception window among the multiple random access response reception windows ends. In order words, the UE may consider a random access response reception of the first multiple random access preambles is successful and transmits a message 3 to the network, when at least one of the random access responses is received until the last random access response reception window ends.

Specifically, even though the RAR Window 1 ends and the UE doesn't receive any RAR1 or RAR2, the UE doesn't transmit another RAP at this point in time. Instead, the UE continues monitoring RAR in RAR2 Window 2.

That is, when an RAR window ends, the UE determines to transmit another certain number of RAPs again as follows:

If the RAR window is the last RAR window,
  If the UE doesn't receive any RAR within the RAR windows or the UE doesn't receive any RAR containing the RAP that matches one of the transmitted RAPs,
  The UE randomly selects a certain number of different RAPs again and transmit the selected RAPs as above;
Else if the RAR window is not the last RAR window,
  If the UE doesn't receive any RAR within the RAR window or the UE doesn't receive any RAR containing the RAP that matches one of the transmitted RAPs,
  The UE continues monitoring RAR for the remaining RAR window that doesn't end yet.
  The UE doesn't select another certain number of different RAPs;

When the random access response reception is finally determined as not successful, the UE may transmit second multiple random access preambles for the random access procedure to the network (S730). That is, when the RAR Window 2 ends and the UE doesn't receive any RAR2, then the UE may consider that RAR reception fails and randomly selects 2 RAPs again and transmits the selected RAP3 and RAP4.

The UE may monitor the random access responses, as like in S720, during RAR Windows 3 and 4 (S740).

FIG. 10 shows another example for a UE to transmit multiple RAPs for a single RA procedure according to one embodiment of the present invention.

In the example of FIG. 10, the UE is configured to transmit 2 RAPs if the UE triggers CBRA while the UE is in RRC IDLE, i.e., when the UE establishes an RRC Connection. Then, the UE randomly selects two different RAPs, i.e., RAP1 and RAP2, selects RA resource, e.g., the next available subframe containing PRACH, for each selected RAP and transmits the selected RAPs on corresponding RA resource (S1010).

Then, the UE starts monitoring RAR1 and RAR1 by starting RAR window 1 and RAR window 2 (S1020). In this example, the UE receives RAR1 and RAR2, where RAR1 includes T-C-RNTI1 and RAR2 includes T-C-RNTI2.

That is, within an RAR window, if the UE receives an RAR corresponding to the RAP which is one of the RAPs transmitted by the UE, the UE considers that RAR reception is successful for this CBRA procedure.

In this case, by using the UL grant received in the RAR, the UE transmits a Msg3. Also in this case, the UE may not monitor further RARs containing an RAP that matches one of the transmitted RAPs even though the RAR windows for the transmitted RAPs don't end. I.e., if the eNB transmits the RAR in response to other RAPs, the UE may not receive or may ignore the RAR.

However, as an alternative, the UE may transmit multiple Msg3 based on multiple RARs.

In FIG. 10, by using UL grant in RAR1, the UE transmits Msg3_1, and by using UL grant in RAR2, the UE transmits Msg3_2 (S1030). Here, the UE starts mac-ContentionResolutionTimer1 (M-CRT1) and mac-ContentionResolutionTimer2 (M-CRT2) when transmitting a Msg3_1 and a Msg3_2, respectively.

In FIG. 10, the UE receives a Msg4 via PDCCH addressed to T-C-RNTI2, and considers that this CBRA procedure successfully completes (S1040). Then, the UE flushes all HARQ buffers used for transmission of Msg3_1 and Msg3_2; sets its C-RNTI to the T-C-RNTI2; stops M-CRT1 and M-CRT2, stops monitoring further Msg4; and discards T-C-RNTI1 and T-C-RNTI2.

That is, if the UE transmits the Msg3, the UE receives a Msg4 in response to the Msg3 as follows:

The UE manages multiple timers for contention resolution, i.e., mac-ContentionResolutionTimer, where each timer corresponds to each Msg3; I.e., the UE starts a mac-ContentionResolutionTimer upon sending a Msg3. If the UE transmits multiple Msg3, the UE starts a mac-ContentionResolutionTimer for each of the Msg3.

While a mac-ContentionResolutionTimer is running:
  If the UE receives a Msg4 for the UE, the UE considers that the CBRA procedure completes successfully;
  The UE considers that this CBRA procedure successfully completes;
  The UE flushes all HARQ buffers used for transmission of Msg3;
  The UE sets its C-RNTI to the T-C-RNTI by which the UE receives the Msg4 if needed;
  The UE stops all mac-ContentionResolutionTimers and stops monitoring further Msg4; and
  The UE discards all Temporary C-RNTIs.

When an mac-ContentionResolutionTimer ends, the UE determines to transmit another certain number of RAPs again as follows:

If the mac-ContentionResolutionTimer window is the last mac-ContentionResolutionTimer,
  If the UE doesn't receive any Msg4 for the UE,
  The UE considers that the contention resolution fails; and
  The UE randomly selects a certain number of different RAPs again and transmit the selected RAPs as above;
Else if the mac-ContentionResolutionTimer window is not the last mac-ContentionResolutionTimer,
  If the UE doesn't receive any Msg4 for the UE,
  The UE continues monitoring Msg4 for the remaining mac-ContentionResolutionTimers that doesn't end yet.
  The UE doesn't select another certain number of different RAPs;

Note that the UE considers that the UE receives the Msg4 for the UE as follows:
  if the UE receives PDCCH addressed by its C-RNTI and an UL grant for a new transmission in case the UE transmitted the Msg3 including C-RNTI MAC CE;
  if the UE receives the PDCCH transmission addressed to its Temporary C-RNTI in case the UE transmitted the Msg3 including CCCH SDU;

Note that when the UE counts the number of RAP transmissions by using e.g., preambleTransMax, the UE may increment the counter by 1 for the certain number of RAPs transmission. In other words, the UE considers that certain number of RAPs transmissions in parallel as one RAP transmission.

FIG. 11 is a block diagram of a communication apparatus according to an embodiment of the present invention.

The apparatus shown in FIG. 11 can be a user equipment (UE) and/or eNB adapted to perform the above mechanism, but it can be any apparatus for performing the same operation.

As shown in FIG. 11, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 11 may represent a UE comprising a receiver (135) configured to receive signal from the network, and a transmitter (135) configured to transmit signals to the network. These receiver and the transmitter can constitute the transceiver (135). The UE further comprises a processor (110) connected to the transceiver (135: receiver and transmitter).

Also, FIG. 11 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP system, the present invention is applicable to a variety of wireless communication systems, e.g. IEEE system, in addition to the 3GPP system.

The invention claimed is:

1. A method for a user equipment (UE) performing random access to a network, the method comprising:
transmitting first multiple random access preambles for a random access procedure to the network;
monitoring, during each of multiple random access response reception windows, random access responses respectively corresponding to each of the first multiple random access preambles;
transmitting second multiple random access preambles for the random access procedure to the network, based on a determination that a random access response reception of the first multiple random access preambles is not successful,
wherein the determination that the random access response reception is not successful is based on none of the random access responses being successfully received until a last random access response reception window among the multiple random access response reception windows ends;
transmitting two or more 'Message 3' messages of the random access procedure to the network, based on reception of two or more of the random access responses; and
starting two or more contention resolution timers for each of the two or more 'Message 3' messages.

2. The method of claim 1, wherein the UE considers the random access response reception of the first multiple random access preambles as successful and transmits a 'Message 3' message to the network, based on at least one of the random access responses being received until the last random access response reception window ends.

3. The method of claim 2, wherein the UE does not further monitor another random access response, based on the at least one of the random access responses being received.

4. The method of claim 1, wherein a contention resolution by the two or more 'Message 3' messages is determined as not successful, based on none of 'Message 4' messages corresponding to each of the two or more 'Message 3' messages being received until a last contention resolution timer among the contention resolution timers ends.

5. A user equipment (UE) configured to perform random access to a network, the UE comprising:
   a transceiver; and
   a processor configured to control the UE to performs operations comprising:
   transmitting, via the transceiver, first multiple random access preambles for a random access procedure to the network;
   monitoring, during each of multiple random access response reception windows, random access responses respectively corresponding to each of the first multiple random access preambles;
   transmitting, via the transceiver, second multiple random access preambles for the random access procedure to the network, based on a determination that a random access response reception of the first multiple random access preambles is not successful,
   wherein the determination that the random access response reception is not successful is based on none of the random access responses being successfully received until a last random access response reception window among the multiple random access response reception windows ends;
   transmitting, via the transceiver, two or more 'Message 3' messages of the random access procedure to the network, based on reception of two or more of the random access responses; and
   starting two or more contention resolution timers for each of the two or more 'Message 3' messages.

6. The UE of claim 5, wherein the operations further comprise:
   considering the random access response reception of the first multiple random access preambles as successful and transmitting, via the transceiver, a 'Message 3' message to the network, based on at least one of the random access responses being received until the last random access response reception window ends.

7. The UE of claim 6, wherein the operations further comprise:
   not further monitoring another random access response, based on the at least one of the random access responses being received.

8. The UE of claim 5, wherein the operations further comprise:
   determining a contention resolution by the two or more 'Message 3' messages as not successful, based on none of 'Message 4' messages corresponding to each of the two or more 'Message 3' messages being received until a last contention resolution timer among the contention resolution timers ends.

\* \* \* \* \*